United States

Ogawa

4,142,779

Mar. 6, 1979

[54] ZOOM LENS SYSTEM

[75] Inventor: Ryota Ogawa, Tsurugashima, Japan

[73] Assignee: Asahi Kogaku Kogyo Kabushiki Kaisha, Tokyo, Japan

[21] Appl. No.: 794,589

[22] Filed: May 6, 1977

[30] Foreign Application Priority Data

May 10, 1976 [JP] Japan .................. 51-52938

[51] Int. Cl.² ............................................ G02B 15/14
[52] U.S. Cl. .................................................. 350/184
[58] Field of Search ..................... 350/184, 186

[56] References Cited
FOREIGN PATENT DOCUMENTS 2557547 7/1976 Fed. Rep. of Germany ........... 350/184

*Primary Examiner*—Conrad J. Clark

*Attorney, Agent, or Firm*—Sughrue, Rothwell, Mion, Zinn and Macpeak

[57] ABSTRACT

A zoom lens system wherein the front lens group comprises, in order, a positive lens, a high power negative meniscus lens, a negative lens, and a high power positive lens. The relatively movable rear lens group comprises a plurality of lenses in front of and behind a double concave lens, including a double convex lens on the object side and at least two convex lenses on the image side. The various lens system parameters, including the minimum focal distance, the spacing between the front and rear lens groups, the maximum angle of incidence, the overall length of the system, the amount of back-focus zoom variation, and the magnification variation ratio, are selected to satisfy six different limiting conditions which balance an optimum miniaturization with a satisfactory aberration level.

4 Claims, 21 Drawing Figures

FRONT LENS GROUP

REAR LENS GROUP

ZOOM LENS SYSTEM

BACKGROUND OF THE INVENTION

This invention relates to a wide angle zoom lens system for a camera which is small, compact, and has low residual aberration.

Zoom lens systems having a low magnification variation ratio have heretofore been miniaturized by providing a front lens group having a negative focal distance and a rear lens group having a positive focal distance, such lens groups being mechanically displaced relative to each other to maintain the image plane at a constant position. It is necessary, however, to increase the power of the front lens group in order to reduce the size of the lens system, and if this power is increased variations due to the difference in focal distance between the spherical aberration and the coma aberration also increase, especially the amount of residual spherical aberration at the maximum focal distance.

SUMMARY OF THE INVENTION

An object of this invention is thus to overcome the above-described drawback by providing a zoom lens system wherein the front lens group comprises, in order, a positive lens, a high power negative meniscus lens, a negative lens, and a high power positive lens. The relatively movable rear lens group comprises a plurality of lenses in front of and behind a double concave lens, including a double convex lens on the object side and at least two convex lenses on the image side. The various lens system parameters, including the minimum focal distance, the spacing between the front and rear lens groups, the maximum angle of incidence, the overall length of the system, the amount of back-focus zoom variation, and the magnification variation ratio, are selected to satisfy six different limiting conditions which balance an optimum miniaturization with a satisfactory aberration level.

BRIEF DESCRIPTION OF THE DRAWINGS

In the drawings:

FIGS. 8(a), 8(b)–11(c) are aberration curve plots for minimum (a), intermediate (b), and maximum (c) focal distances for the lens systems shown in FIGS. 4–7, respectively.

DETAILED DESCRIPTION OF THE PREFERRED EMBODIMENT

Figure 1A:
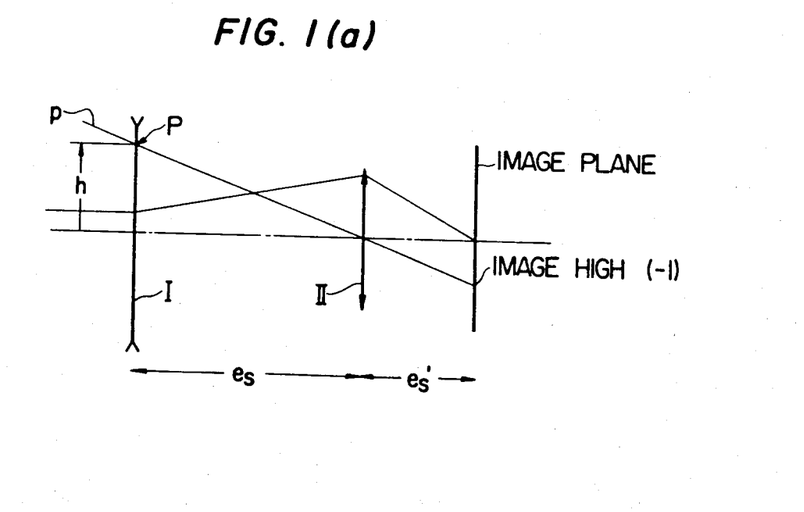
FIGS. 1(a) and (b) are schematic diagrams of typical zoom lens system parameters.
Figure 1B:
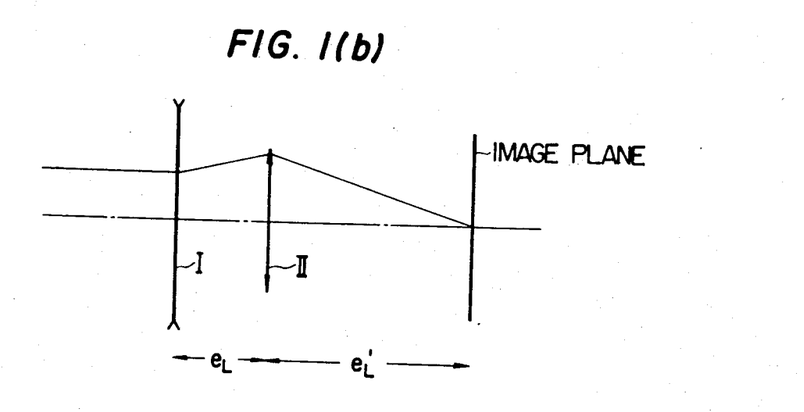
Figure 2:
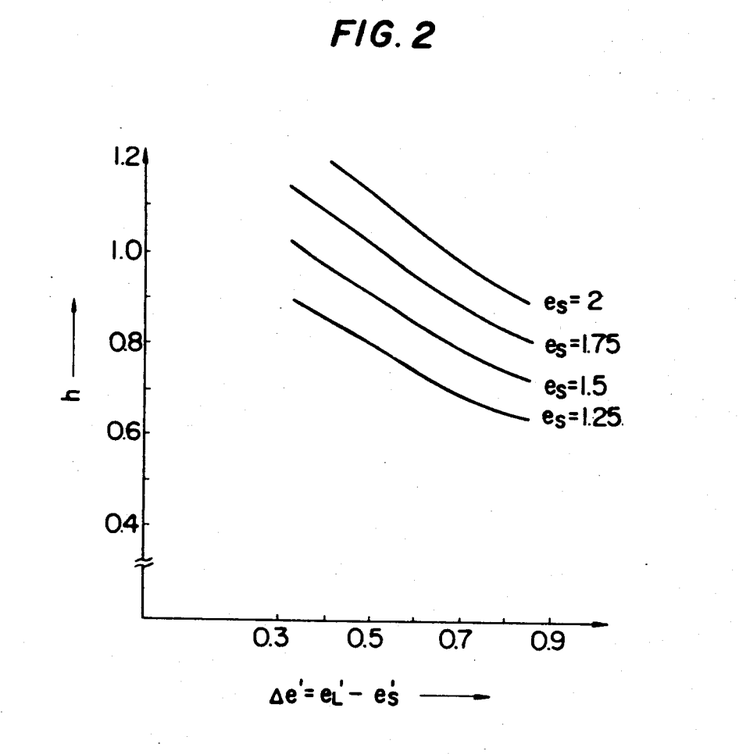
FIGS. 2, 3(a) and 3(b) are graphical representations of various lens system design considerations.
Figure 3A:
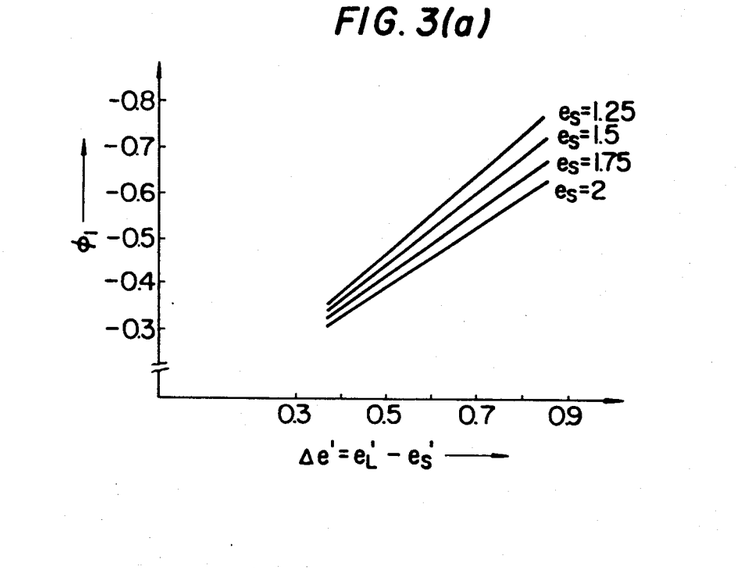
Figure 3B:
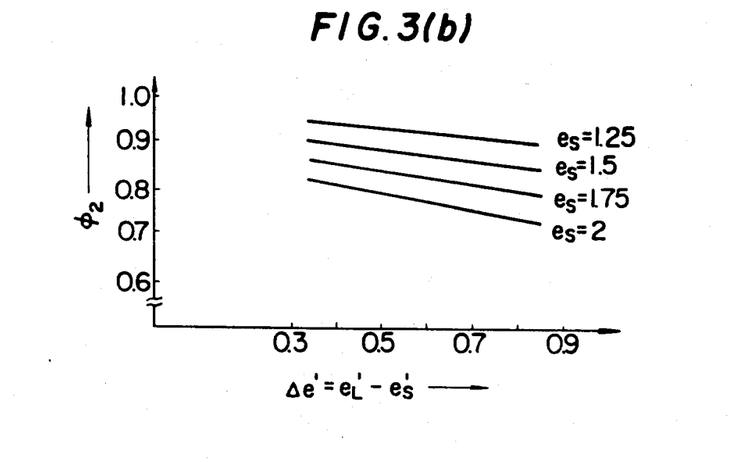
Figure 4:
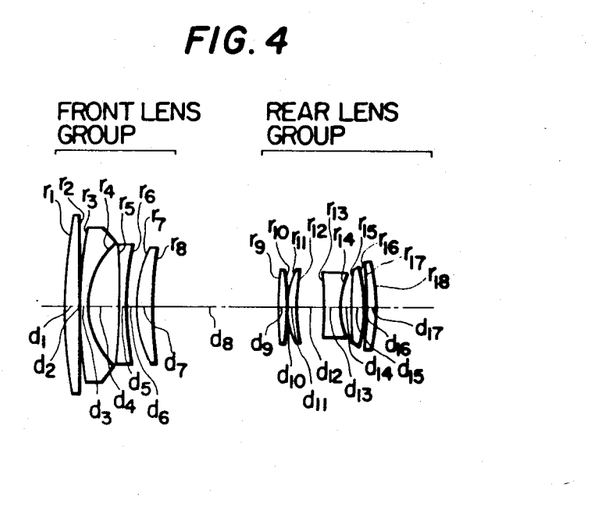
FIGS. 4–7 show structural diagrams of four zoom lens systems according to the invention, corresponding to Examples 1–4 in the specification, respectively.
Figure 5:
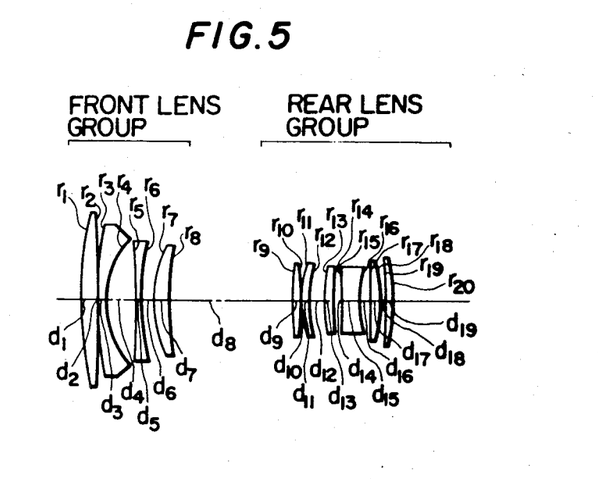
Figure 6:
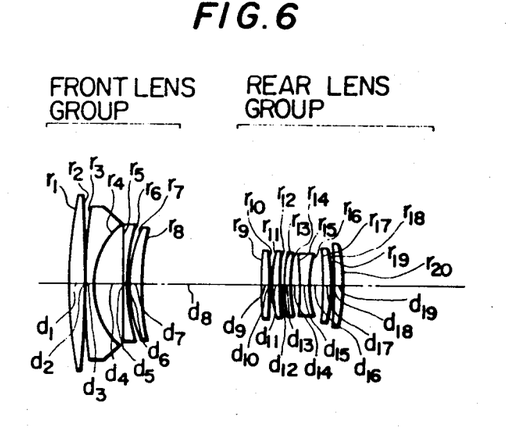
Figure 7:
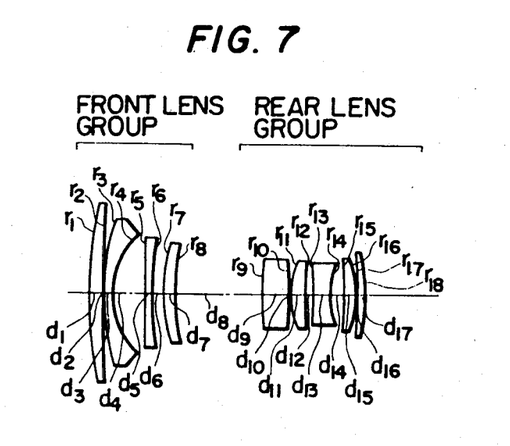
Figure 8A:
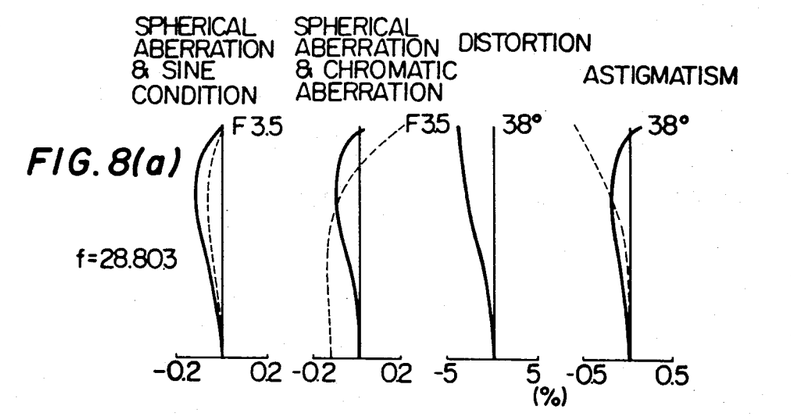
Figure 8B:
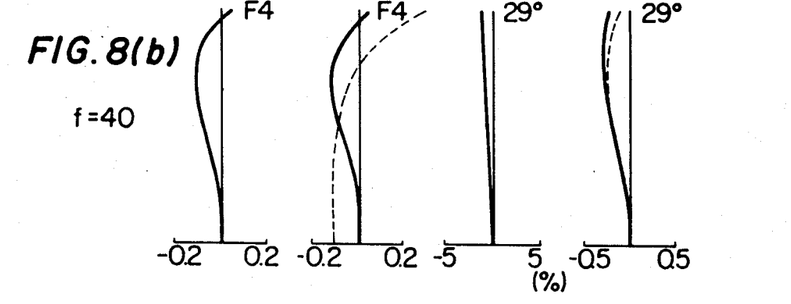
Figure 8C:
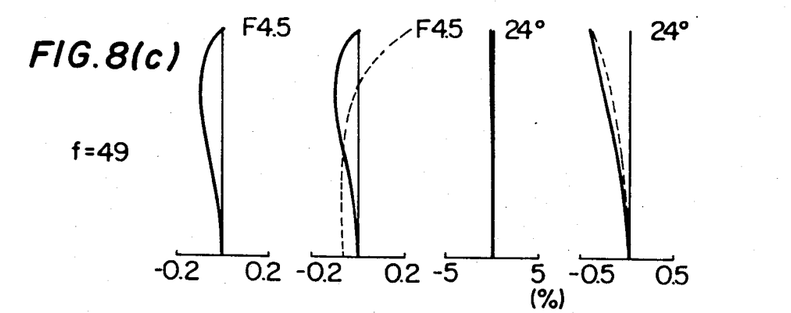
Figure 9A:
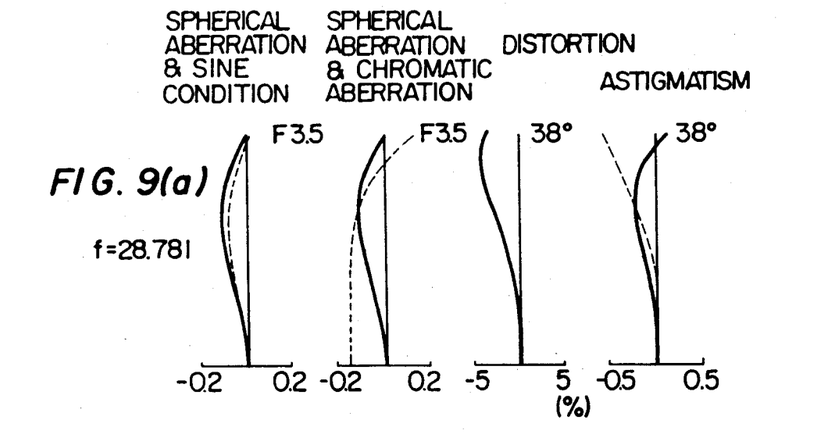
Figure 9B:
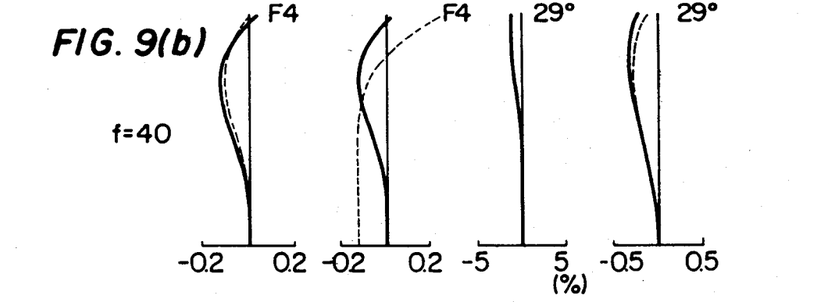
Figure 9C:
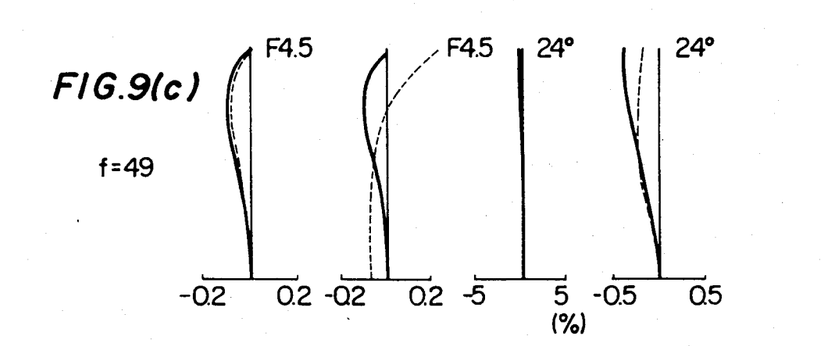
Figure 10A:
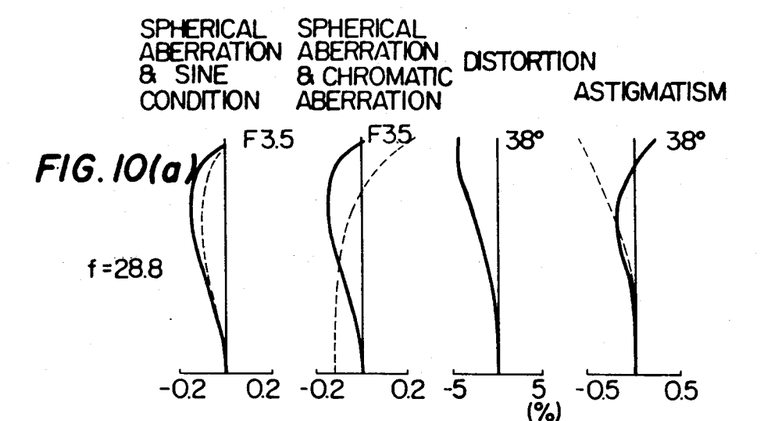
Figure 10B:
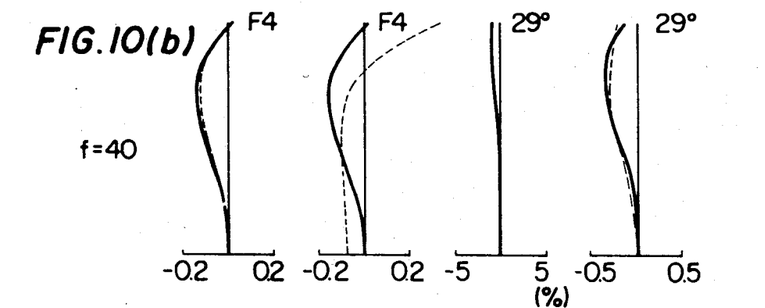
Figure 10C:
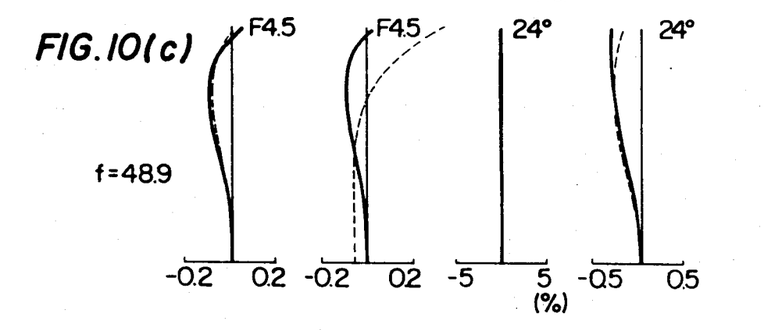
Figure 11A:
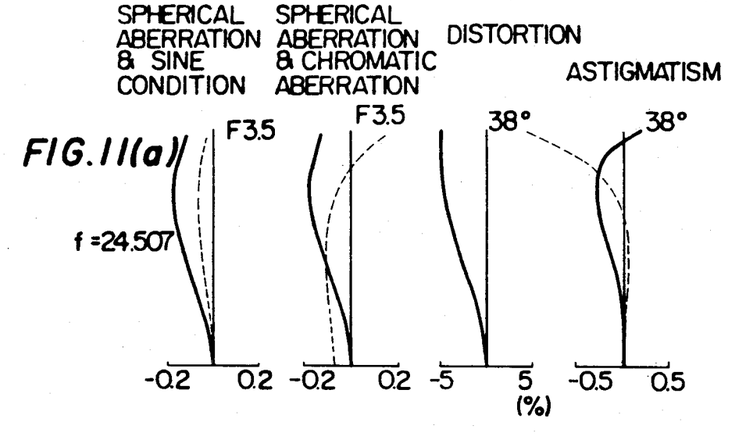
Figure 11B:
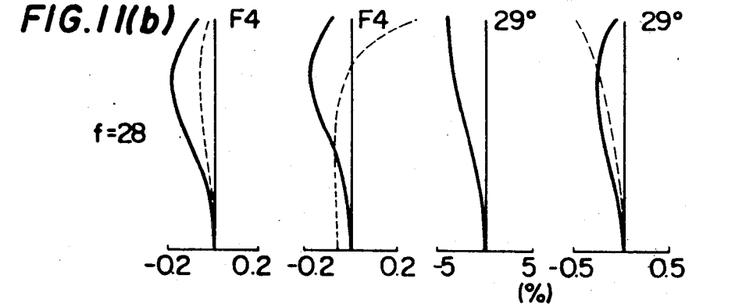
Figure 11C:
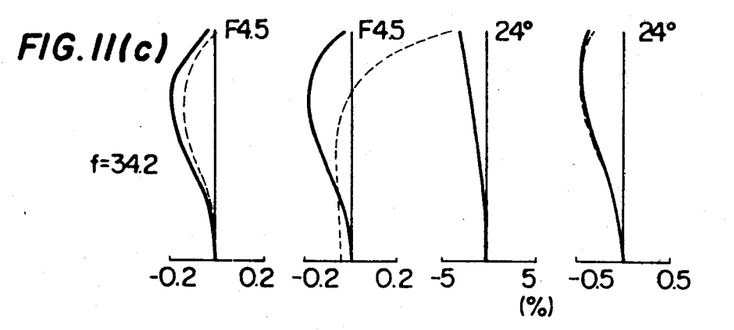

Referring first to FIGS. 1–3 for a discussion of the relevant theoretical considerations involved, FIG. 1(a) shows the paraxial arrangement of a zoom lens system at its minimum focal distance 1, and FIG. 1(b) shows the same lens system at its maximum focal distance Z. In these figures, reference character I designates a front lens group having a power $\phi_1$ and reference character II designates a rear lens group having a power $\phi_2$. In FIG. 1(a) the distance $e_s$ between the front and rear groups is selected so that the focal distance of the overall lens system is 1, and the straight line p designates the main light beam of the luminous flux which, when the lens stop position is in the rear group, forms an image having a maximum height of −1 on an image plane. If it is assumed that the height of the intersection point P between the straight line p and the front lens group is h, then the value h is a radius standard for the lens system. The back focus distance in FIG. 1(a) is designated $e_s{'}$.

In FIG. 1(b) the distance between the front and rear lens groups is $e_L$, and the system focal distance is Z. If the back focus distance is designated $e_L{'}$ and the amount of movement of the rear lens group in zooming from a focal distance of 1 to Z, or the zoom variation of the back focus distance, is $\Delta e'$, then the following relationships are established:

$$\phi_1 + \phi_2 - e_s\phi_1\phi_2 = 1 \tag{a}$$

$$\phi_1 + \phi_2 - e_L\phi_1\phi_2 = Z \tag{b}$$

$$1 - e_s\phi_1 = e_s{'} \tag{c}$$

$$(1 - e_L\phi_1)Z = e_L{'} \tag{d}$$

$$\Delta e' = e_L{'} - e_s{'} \tag{e}$$

$$h = e_s/e_s{'} \tag{f}$$

Relationships (a) through (f) represent the arrangement of a lens system having a zoom ratio Z, and the relations between the variables in these expressions can be readily obtained through simple calculations, whose results are plotted in FIGS. 2, 3(a) and 3(b). The conditions required to miniaturize a lens system will be described in detail with reference to these figures.

In FIG. 2 the relation between the amount of zoom movement $\Delta e'$ of the rear lens group and the value of h for the radius of the front lens group is plotted for a variety of values of the distance $e_s$ between the front and rear lens groups at the minimum focal distance, that is, $e_s = 1.25, 1.5, 1.75$ and 2.

To miniaturize the lens system it is desirable that the radius of the front lens group be small, which corresponds to a small value of h.

The straight $e_s$ lines in FIG. 2 extend obliquely downward for all values thereof, whereby it is desirable that $\Delta e'$ be as high as possible. In other words, for miniaturization the movement of the rear lens group should be as large as possible.

To develop the relationships between this condition and the power distributions of the front and rear lens groups, the relationships between $\Delta e'$ and the powers $\phi_1$ and $\phi_2$ will be described with reference to FIGS. 3(a) and 3(b), wherein such relationships are plotted for various values of $e_s$. The group of straight lines in FIG. 3(a) extend obliquely upward, while those in FIG. 3(b) have more gentle downward inclinations, and the lines in FIG. 3(a) tend to fan out more than those in FIG. 3(b). Thus, the desirability of a large $\Delta e'$ concluded from FIG. 2 corresponds to a high power for the front lens groups, but same will not particularly affect the power of the rear lens group.

In the zoom lens arrangement of the present invention the theoretical criterion of increasing the power of the front lens group in order to increase the amount of movement of the rear lens group is obtained from a consideration of the plots shown in FIGS. 2 and 3. As the position and width of the luminous flux passing through the front lens group varies with zooming, however, this criterion is disadvantageous with respect to maintaining satisfactory aberration variation.

A specific feature of the invention is to overcome this difficulty and provide a compact lens system with low residual aberration, and to this end the conditions and requirements set forth below should be satisfied.

The zoom lens system according to this invention comprises a front lens group having a negative focal distance and a rear lens group having a positive focal distance, as in prior art, and the front and rear lens groups are mechanically displaced to maintain the image plane at a constant position. The front lens group comprises first, second, third and fourth lenses as viewed from the object side. The first lens is a positive lens, the second lens is a negative meniscus lens having a high negative power, the third lens is a negative lens, and the fourth lens is a positive lens having a high positive power. Assuming that the focal distance of the front lens group is Fa, the focal distance of the first lens is $f_{1,2}$, the focal distance of the image side surface of the second lens is $f_4$, and the focal distance from the image side of the third lens to the object side of the fourth lens is $f_{6,7}$.

The rear lens group has a total length a, and comprises first and second lens groups respectively positioned in front of and behind a double concave lens. The first lens group includes at least two lenses including a double convex lens on the object side, and the second lens group includes at least two convex lenses. The length from the object side of the double concave lens to the object side of the double donvex lens is b.

When the lens system is adjusted to a minimum or shortest focal distance $f_s$, the air gap between the front and rear lens group is ls, the maximum angle of incidence is 2w(degree), the overall length of the lens system including the back-focus is Σ, the amount of back-focus zoom variation is $f_B$, and the magnification variation ratio is R, the following conditions must be satisfied:

$$0.25 < \frac{\Delta f_B}{ls \cdot R} < 0.38 \quad (1)$$

$$2.0 < \frac{f_{1,2}}{|Fa|} < 6.0 \quad (2)$$

$$0.35 < \frac{f_4}{Fa} < 0.6 \quad (3)$$

$$0.7 < \frac{f_{6,7}}{|Fa|} < 1.8 \quad (4)$$

$$0.35 < \frac{b}{a} < 0.55 \quad (5)$$

$$0.040 < \frac{\Sigma}{2w \cdot Fs} < 0.056 \quad (6)$$

Condition (1) is necessary to miniaturize the lens system, and results from the data plotted in FIGS. 2 and 3. If the upper limit in condition (1) is exceeded it is advantageous for miniaturization, especially with respect to the diameter of the front lens group, but exceeding this upper limit will also increase the amount of movement of the rear lens group. Therefore, especially in the rear lens group, the surface refraction on the image side of the high power negative lenses varies with the zoom position, and the coma flare on the shortest focal distance side is particularly increased. Furthermore, if the upper limit of condition (1) is exceeded the front and rear lens groups approach each other, and a suitable magnification variation ratio cannot be achieved without contact between the lens groups. If the lower limit is exceeded the conclusion reached from FIGS. 2 and 3 cannot be satisfied; that is, the power of the front lens group is reduced rather than increased. Although this is advantageous for aberration correction, it makes miniaturization very difficult.

Conditions (2), (3) and (4) are effective to complement condition (1) for both realizing miniaturization and lessening the amount of residual aberration.

More specifically, if the upper limit of condition (2) is exceeded the effect of reducing the diameters of the lenses after the second lens is decreased and the effect of miniaturizing the overall system is lessened, and the distortion correcting effects are also low. Accordingly, in order to prevent the occurrence of negative distortion on the object side of the second lens, a strong power is required for this surface. If the successive lens powers after this surface, on the image side, are intensified, aberration is adversely affected. If the lens powers after this surface are weakened, however, in order to overcome such difficulty, the object of miniaturizing the lens system is thwarted. If the lower limit in condition (2) is exceeded, on the other hand, it is necessary to increase the image side power of the second lens in order to maintain satisfactory coma aberration on the shortest focal distance side. This works against lowering the spherical aberration on the longest focal distance side, however.

If the upper limit of condition (3) is exceeded it is difficult to correct coma aberration for wide angles of view, and if the lower limit is exceeded it is difficult to cover wide angles of view and very difficult to correct excessive spherical aberration on the longest focal distance side because $|f_4|$ is too small.

The image side of the third lens in the front lens group and the object side of the fourth lens are defined by condition (4) such that the spherical and coma aberrations on the longest focal distance side are well balanced. If the upper limit of condition (4) is exceeded the spherical aberration at the longest focal distance becomes excessive in the front lens group. To avoid this it is necessary to make the curvature of the image side of the second lens smaller, which increases the size of the lens system. If the lower limit is exceeded the power of the object side of the fourth lens is increased in the positive direction, which causes the residual aberrations at the longest focal distance, especially the spherical and coma aberrations, to vary more than at other focal distances. It is difficult to correct such variations by means of the rear lens group.

Condition (5) determines the position of the double concave lens within the rear lens group. This is necessary to miniaturize the lens system, lengthen the back-focus, and maintain satisfactory aberration correction. If the upper limit of condition (5) is exceeded the double concave lens is moved toward the image side, which shortens the back-focus and causes undue coma aberration. To prevent this it is necessary to move the incident pupil position toward the image side, but this enlarges the lens system by increasing the diameter of the front lens group. If the lower limit is exceeded the double concave lens moves to far toward the object side, which increases the spherical aberration.

Condition (6) relates to the overall minituarization of the lens system, and is closely coordinated with conditions (1)–(5). If the upper limit of condition (6) is exceeded the diameter of the lens system increases, and if the lower limit is exceeded it is difficult to correct the resulting aberrations within the limits of conditions (1)–(5).

The following numerical data relates to actual zoom lens systems according to the invention as shown in FIGS. 4–7, which correspond respectively to Examples 1–4. Similarly, the aberration curves in FIGS. 8–11 correspond respectively to Examples 1–4. In the data presented in the Examples:

$r_1$, $r_2$ — are the radii of curvature of the refractive surfaces of the lenses disposed in order from the object side.

$d_1$, $d_2$ — are the lengths of the lines designated in the corresponding drawing figures, either the thicknesses of the lenses or the distances between them, $n_1$, $n_2$ — are the refractive indices of the lens glasses with respect to the "d" line, and $v_1$, $v_2$ — are the Abbe numbers of the lens glasses.

EXAMPLE 1

Angle of View 76° ~ 48°, $F_a = -45.851$

Front Lens Group

| | | | |
|---|---|---|---|
| $r_1 =$ 93.224 | $d_1 = 3.5$ | $n_1 = 1.58913$ | $v_1 = 61.1$ |
| $r_2 = -3721.425$ | $d_2 = 0.1$ | | |
| $r_3 =$ 105.692 | $d_3 = 1.7$ | $n_2 = 1.80610$ | $v_2 = 40.9$ |
| $r_4 =$ 19.089 | $d_4 = 6.77$ | | |
| $r_5 = -260.395$ | $d_5 = 1.50$ | $n_3 = 1.64000$ | $v_3 = 60.2$ |
| $r_6 =$ 64.303 | $d_6 = 2.53$ | | |
| $r_7 =$ 32.315 | $d_7 = 3.18$ | $n_4 = 1.80518$ | $v_4 = 25.4$ |
| $r_8 =$ 85.920 | $d_8 = 27.6 \sim 11.9169 \sim 4.5074$ | | |

Rear Lens Group

| | | | |
|---|---|---|---|
| $r_9 =$ 69.229 | $d_9 = 1.94$ | $n_5 = 1.75500$ | $v_5 = 52.4$ |
| $r_{10} = -95.618$ | $d_{10} = 0.10$ | | |
| $r_{11} =$ 20.592 | $d_{11} = 2.00$ | $n_6 = 1.75500$ | $v_6 = 52.4$ |
| $r_{12} =$ 44.108 | $d_{12} = 6.17$ | | |
| $r_{13} = -67.806$ | $d_{13} = 3.77$ | $n_7 = 1.80518$ | $v_7 = 25.4$ |
| $r_{14} =$ 22.366 | $d_{14} = 2.24$ | | |
| $r_{15} =$ 104.399 | $d_{15} = 3.00$ | $n_8 = 1.56013$ | $v_8 = 47.0$ |
| $r_{16} = -27.764$ | $d_{16} = 0.10$ | | |
| $r_{17} = -482.240$ | $d_{17} = 2.00$ | $n_9 = 1.51633$ | $v_9 = 64.1$ |
| $r_{18} = -50.921$ | | | |

| F number | focal distance | back focus |
|---|---|---|
| 1 : 3.5 | 28.803 | 41.217 |
| 1 : 4 | 40 | 49.812 |
| 1 : 4.5 | 49 | 56.720 |

$f_{1,2} = 154.425$    $\Delta f_B = 15.503$
$f_4 = -23.681$    $ls = 27.6$
$f_{6,7} = 64.139$    $R = 1.701$

EXAMPLE 2

Angle of View 76° ~ 48°, $F_a = -45.619$

Front Lens Group

| | | | |
|---|---|---|---|
| $r_1 = 89.072$ | $d_1 = 3.50$ | $n_1 = 1.58913$ | $v_1 = 61.1$ |
| $r_2 = -3054.716$ | $d_2 = 0.10$ | | |
| $r_3 = 107.950$ | $d_3 = 1.70$ | $n_2 = 1.80610$ | $v_2 = 40.9$ |
| $r_4 = 19.030$ | $d_4 = 6.76$ | | |
| $r_5 = -230.929$ | $d_5 = 1.50$ | $n_3 = 1.64000$ | $v_3 = 60.2$ |
| $r_6 = 65.867$ | $d_6 = 2.79$ | | |
| $r_7 = 32.889$ | $d_7 = 3.18$ | $n_4 = 1.80518$ | $v_4 = 25.4$ |
| $r_8 = 88.200$ | $d_8 = 27.37 \sim 11.797 \sim 4.46$ | | |

Rear Lens Group

| | | | |
|---|---|---|---|
| $r_9 = 77.394$ | $d_9 = 1.94$ | $n_5 = 1.77250$ | $v_5 = 49.7$ |
| $r_{10} = -105.520$ | $d_{10} = 0.10$ | | |
| $r_{11} = 21.380$ | $d_{11} = 2.00$ | $n_6 = 1.77250$ | $v_6 = 49.7$ |
| $r_{12} = 40.674$ | $d_{12} = 3.37$ | | |
| $r_{13} = 37.468$ | $d_{13} = 2.00$ | $n_7 = 1.51633$ | $v_7 = 64.1$ |
| $r_{14} = 87.373$ | $d_{14} = 1.65$ | | |
| $r_{15} = -69.120$ | $d_{15} = 3.54$ | $n_8 = 1.80518$ | $v_8 = 25.4$ |

EXAMPLE 2-continued

| | | | |
|---|---|---|---|
| $r_{16} = 21.580$ | $d_{16} = 2.44$ | | |
| $r_{17} = 251.725$ | $d_{17} = 3.00$ | $n_9 = 1.56013$ | $v_9 = 47.0$ |
| $r_{18} = -26.946$ | $d_{18} = 0.10$ | | |
| $r_{19} = -418.582$ | $d_{19} = 2.00$ | $n_{10} = 1.51633$ | $v_{10} = 64.1$ |
| $r_{20} = -54.000$ | | | |

| F number | focal distance | back-focus |
|---|---|---|
| 1 : 3.5 | 28.781 | 40.482 |
| 1 : 4 | 40 | 49.083 |
| 1 : 4.5 | 49 | 55.984 |

$f_{1,2} = 146.969$    $\Delta f_B = 15.502$
$f_4 = -23.608$    $ls = 27.37$
$f_{6,7} = 64.814$    $R = 1.703$

EXAMPLE 3

Angle of View 76° ~ 48°, $F_a = -47.730$

Front Lens Group

| | | | |
|---|---|---|---|
| $r_1 = 99.200$ | $d_1 = 3.50$ | $n_1 = 1.58913$ | $v_1 = 61.1$ |
| $r_2 = -408.000$ | $d_2 = 0.10$ | | |
| $r_3 = 178.938$ | $d_3 = 1.70$ | $n_2 = 1.80610$ | $v_2 = 40.9$ |
| $r_4 = 18.000$ | $d_4 = 6.02$ | | |
| $r_5 = 245.958$ | $d_5 = 1.50$ | $n_3 = 1.63854$ | $v_3 = 55.4$ |
| $r_6 = 53.700$ | $d_6 = 0.10$ | | |
| $r_7 = 25.294$ | $d_7 = 3.18$ | $n_4 = 1.80518$ | $v_4 = 25.4$ |
| $r_8 = 60.500$ | $d_8 = 26.35 \sim 11.42 \sim 4.43$ | | |

Rear Lens Group

| | | | |
|---|---|---|---|
| $r_9 = 56.177$ | $d_9 = 1.94$ | $n_5 = 1.77250$ | $v_5 = 49.7$ |
| $r_{10} = -123.980$ | $d_{10} = 0.10$ | | |
| $r_{11} = 17.541$ | $d_{11} = 2.00$ | $n_6 = 1.77250$ | $v_6 = 49.7$ |
| $r_{12} = 53.200$ | $d_{12} = 0.77$ | | |
| $r_{13} = 40.040$ | $d_{13} = 1.48$ | $n_7 = 1.51633$ | $v_7 = 64.1$ |
| $r_{14} = 31.900$ | $d_{14} = 1.87$ | | |
| $r_{15} = -85.725$ | $d_{15} = 2.69$ | $n_8 = 1.80518$ | $v_8 = 25.4$ |
| $r_{16} = 17.608$ | $d_{16} = 2.22$ | | |
| $r_{17} = 158.000$ | $d_{17} = 2.80$ | $n_9 = 1.56013$ | $v_9 = 47.0$ |
| $r_{18} = -23.537$ | $d_{18} = 0.10$ | | |
| $r_{19} = -94.050$ | $d_{19} = 2.00$ | $n_{10} = 1.51633$ | $v_{10} = 64.1$ |
| $r_{20} = -45.200$ | | | |

| F number | focal distance | back-focus |
|---|---|---|
| 1 : 3.5 | 28.8 | 38.035 |
| 1 : 4 | 40 | 45.582 |
| 1 : 4.5 | 48.9 | 51.579 |

$f_{1,2} = 135.798$    $\Delta f_B = 13.544$
$f_4 = -22.330$    $ls = 26.35$
$f_{6,7} = 50.050$    $R = 1.698$

EXAMPLE 4

Angle of View 84° ~ 64°, $F_a = -40.117$

Front Lens Group

| | | | |
|---|---|---|---|
| $r_1 = 97.236$ | $d_1 = 3.30$ | $n_1 = 1.58913$ | $v_1 = 61.1$ |
| $r_2 = 1802.053$ | $d_2 = 0.10$ | | |
| $r_3 = 60.645$ | $d_3 = 1.20$ | $n_2 = 1.80400$ | $v_2 = 46.6$ |
| $r_4 = 16.748$ | $d_4 = 7.64$ | | |
| $r_5 = -3569.993$ | $d_5 = 1.20$ | $n_3 = 1.67790$ | $v_3 = 50.7$ |
| $r_6 = 48.437$ | $d_6 = 2.62$ | | |
| $r_7 = 27.575$ | $d_7 = 2.74$ | $n_4 = 1.80518$ | $v_4 = 25.4$ |
| $r_8 = 57.940$ | $d_8 = 19.014 \sim 12.834 \sim 4.973$ | | |

Rear Lens Group

| | | | |
|---|---|---|---|
| $r_9 = 66.935$ | $d_9 = 6.02$ | $n_5 = 1.80610$ | $v_5 = 40.9$ |
| $r_{10} = -92.610$ | $d_{10} = 0.27$ | | |
| $r_{11} = 18.790$ | $d_{11} = 2.99$ | $n_6 = 1.80610$ | $v_6 = 40.9$ |
| $r_{12} = 58.296$ | $d_{12} = 1.83$ | | |
| $r_{13} = -64.109$ | $d_{13} = 3.95$ | $n_7 = 1.84666$ | $v_7 = 23.9$ |
| $r_{14} = 20.000$ | $d_{14} = 2.87$ | | |
| $r_{15} = -89.868$ | $d_{15} = 2.25$ | $n_8 = 1.50977$ | $v_8 = 62.1$ |
| $r_{16} = -23.044$ | $d_{16} = 0.27$ | | |
| $r_{17} = 1284.874$ | $d_{17} = 2.20$ | $n_9 = 1.51633$ | $v_9 = 64.1$ |
| $r_{18} = -26.693$ | | | |

| F number | focal distance | back-focus |
|---|---|---|
| 1 : 3.5 | 24.507 | 36.624 |
| 1 : 4 | 28.000 | 39.259 |
| 1 : 4.5 | 34.200 | 43.937 |

$f_{1,2} = 174.339$    $\Delta f_B = 7.313$
$f_4 = -20.831$    $ls = 19.014$

| -continued | |
|---|---|
| $f_{6.7} = 61.445$ | $R = 1.396$ |

What is claimed is:

1. A zoom lens system including a front lens group having a negative focal distance with respect to the object side and a rear lens group having a positive focal distance with respect thereto, said front and rear lens groups being relatively axially displaceable to maintain the image plane at a constant position, characterized by:
   (a) the front lens group comprising, in order from the object side, a first positive lens, a second negative meniscus lens having a high negative power with respect to the image side, a third negative lens, and a fourth positive lens having a high positive power with respect to the object side,
   (b) the first lens having a focal distance of $f_{1.2}$, the inverse refractive power of the image side of the second lens being $f_4$, and the focal distance between the image side of the third lens and the object side of the fourth lens being $f_{6.7}$,
   (c) the rear lens group comprising a double concave lens, at least two lenses disposed in front of the double concave lens including a double convex lens on the object side of the rear lens group, and at least two convex lenses disposed behind the double concave lens on the image side thereof, and
   (d) the lens system satisfying the following conditions:

(1) $0.25 < \dfrac{\Delta f_B}{l_s \cdot R} < 0.38$, (2) $2.0 < \dfrac{f_{1.2}}{|Fa|} < 6.0$, (3) $0.35 < \dfrac{f_4}{Fa} < 0.6$, (4) $0.7 < \dfrac{f_{6.7}}{|Fa|} < 1.8$, (5) $0.35 < \dfrac{b}{a} < 0.55$, and (6) $0.040 < \dfrac{\Sigma}{2w \cdot Fs} < 0.056$ wherein:
$\Delta f_B$ is the back-focus zoom variation,
$l_s$ is the air gap between the front and rear lens groups at the shortest focal distance,
R is the magnification variation ratio,
Fa is the focal distance of the front lens group,
b is the distance between the object side of the double concave lens and the object side of the double convex lens,
a is the total length of the rear lens group,
$\Sigma$ is the overall length of the lens system, including the back-focus,
2w is the maximum angle of incidence, and
Fs is the shortest focal distance, and wherein the minimum value of the back-focus is greater than Fs, said lens system further defined by:

| Angle of View 76° ~ 48°, Fa = −45.851 | | | | |
|---|---|---|---|---|
| Front Lens Group | | | | |
| $r_1 =$ | 93.224 | $d_1 = 3.5$ | $n_1 = 1.58913$ | $\nu_1 = 61.1$ |
| $r_2 =$ | −3721.425 | $d_2 = 0.1$ | | |
| $r_3 =$ | 105.692 | $d_3 = 1.7$ | $n_2 = 1.80610$ | $\nu_2 = 40.9$ |
| $r_4 =$ | 19.089 | $d_4 = 6.77$ | | |
| $r_5 =$ | −260.395 | $d_5 = 1.50$ | $n_3 = 1.64000$ | $\nu_3 = 60.2$ |
| $r_6 =$ | 64.303 | $d_6 = 2.53$ | | |
| $r_7 =$ | 32.315 | $d_7 = 3.18$ | $n_4 = 1.80518$ | $\nu_4 = 25.4$ |
| $r_8 =$ | 85.920 | $d_8 = 27.6 \sim 11.9169 \sim 4.5074$ | | |
| Rear Lens Group | | | | |
| $r_9 =$ | 69.229 | $d_9 = 1.94$ | $n_5 = 1.75500$ | $\nu_5 = 52.4$ |
| $r_{10} =$ | −95.618 | $d_{10} = 0.10$ | | |
| $r_{11} =$ | 20.592 | $d_{11} = 2.00$ | $n_6 = 1.75500$ | $\nu_6 = 52.4$ |
| $r_{12} =$ | 44.108 | $d_{12} = 6.17$ | | |
| $r_{13} =$ | −67.806 | $d_{13} = 3.77$ | $n_7 = 1.80518$ | $\nu_7 = 25.4$ |
| $r_{14} =$ | 22.366 | $d_{14} = 2.24$ | | |
| $r_{15} =$ | 104.399 | $d_{15} = 3.00$ | $n_8 = 1.56013$ | $\nu_8 = 47.0$ |
| $r_{16} =$ | −27.764 | $d_{16} = 0.10$ | | |
| $r_{17} =$ | −482.240 | $d_{17} = 2.00$ | $n_9 = 1.51633$ | $\nu_9 = 64.1$ |
| $r_{18} =$ | −50.921 | | | |

| F number | focal distance | back focus |
|---|---|---|
| 1 : 3.5 | 28.803 | 41.217 |
| 1 : 4 | 40 | 49.812 |
| 1 : 4.5 | 49 | 56.720 |
| $f_{1.2} =$ 154.425 | | $\Delta f_B =$ 15.503 |
| $f_4 =$ −23.681 | | $l_s =$ 27.6 |
| $f_{6.7} =$ 64.139 | | R = 1.701 | where,
$r_i$ is the radius of curvature of the $i^{th}$ lens surface in order from the object side;
$d_i$ is the distance between the $i^{th}$ and $(i + 1)^{th}$ lens surface;
$n_k$ is the refractive index of the $k^{th}$ lens in order from the object, and
$\nu_k$ is the Abbe number of the $k^{th}$ lens in order from the object.

2. A zoom lens system including a front lens group having a negative focal distance with respect to the object side and a rear lens group having a positive focal distance with respect thereto, said front and rear lens groups being relatively axially displaceable to maintain the image plane at a constant position, characterized by:
   (a) the front lens group comprising, in order from the object side, a first positive lens, a second negative meniscus lens having a high negative power with respect to the image side, a third negative lens, and a fourth positive lens having a high positive power with respect to the object side,
   (b) the first lens having a focal distance of $f_{1.2}$, the inverse refractive power of the image side of the second lens being $f_4$, and the focal distance between the image side of the third lens and the object side of the fourth lens being $f_{6.7}$,
   (c) the rear lens group comprising a double concave lens, at least two lenses disposed in front of the double concave lens including a double convex lens on the object side of the rear lens group, and at least two convex lenses disposed behind the double concave lens on the image side thereof, and
   (d) the lens system satisfying the following conditions:

(1) $0.25 < \dfrac{\Delta f_B}{l_s \cdot R} < 0.38$, (2) $2.0 < \dfrac{f_{1.2}}{|Fa|} < 6.0$, -continued (3) $0.35 < \frac{f_4}{Fa} < 0.6$, (4) $0.7 < \frac{f_{6.7}}{|Fa|} < 1.8$, (5) $0.35 < \frac{b}{a} < 0.55$, and (6) $0.040 < \frac{\Sigma}{2w \cdot Fs} < 0.056$ wherein:

$\Delta f_B$ is the back-focus zoom variation, ls is the air gap between the front and rear lens groups at the shortest focal distance, R is the magnification variation ratio, Fa is the focal distance of the front lens group, b is the distance between the object side of the double concave lens and the object side of the double convex lens, a is the total length of the rear lens group, $\Sigma$ is the overall length of the lens system, including the back-focus, 2w is the maximum angle of incidence, and Fs is the shortest focal distance, and wherein the minimum value of the back-focus is greater than Fs, said lens system further defined by:

| Angle of View 76° ~ 48°, Fa = −45.619 | | | |
|---|---|---|---|
| Front Lens Group | | | |
| $r_1 = 89.072$ | $d_1 = 3.50$ | $n_1 = 1.58913$ | $v_1 = 61.1$ |
| $r_2 = -3054.716$ | $d_2 = 0.10$ | | |
| $r_3 = 107.950$ | $d_3 = 1.70$ | $n_2 = 1.80610$ | $v_2 = 40.9$ |
| $r_4 = 19.030$ | $d_4 = 6.76$ | | |
| $r_5 = -230.929$ | $d_5 = 1.50$ | $n_3 = 1.64000$ | $v_3 = 60.2$ |
| $r_6 = 65.867$ | $d_6 = 2.79$ | | |
| $r_7 = 32.889$ | $d_7 = 3.18$ | $n_4 = 1.80518$ | $v_4 = 25.4$ |
| $r_8 = 88.200$ | $d_8 = 27.37 \sim 11.797 \sim 4.46$ | | |
| Rear Lens Group | | | |
| $r_9 = 77.394$ | $d_9 = 1.94$ | $n_5 = 1.77250$ | $v_5 = 49.7$ |
| $r_{10} = -105.520$ | $d_{10} = 0.10$ | | |
| $r_{11} = 21.380$ | $d_{11} = 2.00$ | $n_6 = 1.77250$ | $v_6 = 49.7$ |
| $r_{12} = 40.674$ | $d_{12} = 3.37$ | | |
| $r_{13} = 37.468$ | $d_{13} = 2.00$ | $n_7 = 1.51633$ | $v_7 = 64.1$ |
| $r_{14} = 87.373$ | $d_{14} = 1.65$ | | |
| $r_{15} = -69.120$ | $d_{15} = 3.54$ | $n_8 = 1.80518$ | $v_8 = 25.4$ |
| $r_{16} = 21.580$ | $d_{16} = 2.44$ | | |
| $r_{17} = 251.725$ | $d_{17} = 3.00$ | $n_9 = 1.56013$ | $v_9 = 47.0$ |
| $r_{18} = -26.946$ | $d_{18} = 0.10$ | | |
| $r_{19} = -418.582$ | $d_{19} = 2.00$ | $n_{10} = 1.51633$ | $v_{10} = 64.1$ |
| $r_{20} = -54.000$ | | | |

| F number | focal distance | back-focus |
|---|---|---|
| 1 : 3.5 | 28.781 | 40.482 |
| 1 : 4 | 40 | 49.083 |
| 1 : 4.5 | 49 | 55.984 |

$f_{1.2} = 146.969$    $\Delta f_B = 15.502$
$f_4 = -23.608$    ls = 27.37
$f_{6.7} = 64.814$    R = 1.703 where, $r_i$ is the radius of curvature of the $i^{th}$ lens surface in order from the object side;

$d_i$ is the distance between the $i^{th}$ and $(i+1)^{th}$ lens surface;

$n_k$ is the refracture index of the $k^{th}$ lens in order from the object, and $v_k$ is the Abbe numer of the $k^{th}$ lens in order from the object.

3. A zoom lens system including a front lens group having a negative focal distance with respect to the object side and a rear lens group having a positive focal distance with respect thereto, said front and rear lens groups being relatively axially displaceable to maintain the image plane at a constant position, characterized by:

(a) the front lens group comprising, in order from the object side, a first positive lens, a second negative meniscus lens having a high negative power with respect to the image side, a third negative lens, and a fourth positive lens having a high positive power with respect to the object side, (b) the first lens having a focal distance of $f_{1.2}$, the inverse refractive power of the image side of the second lens being $f_4$, and the focal distance between the image side of the third lens and the object side of the fourth lens being $f_{6.7}$, (c) the rear lens group comprising a double concave lens, at least two lenses disposed in front of the double concave lens including a double convex lens on the object side of the rear lens group, and at least two convex lenses disposed behind the double concave lens on the image side thereof, and (d) the lens system satisfying the following conditions:

(1) $0.25 < \frac{\Delta f_B}{ls \cdot R} < 0.38$, (2) $2.0 < \frac{f_{1.2}}{|Fa|} < 6.0$, (3) $0.35 < \frac{f_4}{Fa} < 0.6$, (4) $0.7 < \frac{f_{6.7}}{|Fa|} < 1.8$, (5) $0.35 < \frac{b}{a} < 0.55$, and (6) $0.040 < \frac{\Sigma}{2w \cdot Fs} < 0.056$ wherein:

$\Delta f_B$ is the back-focus zoom variation, ls is the air gap between the front and rear lens groups at the shortest focal distance, R is the magnification variation ratio, Fa is the focal distance of the front lens group, b is the distance between the object side of the double concave lens and the object side of the double convex lens, a is the total length of the rear lens group, $\Sigma$ is the overall length of the lens system, including the back-focus, 2w is the maximum angle of incidence, and Fs is the shortest focal distance, and wherein the minimum value of the back-focus is greater than Fs, said lens system further defined by:

| Angle of View 76° ~ 48°, Fa = −47.730 | | | |
|---|---|---|---|
| Front Lens Group | | | |
| $r_1 = 99.200$ | $d_1 = 3.50$ | $n_1 = 1.58913$ | $v_1 = 61.1$ |
| $r_2 = -408.000$ | $d_2 = 0.10$ | | |
| $r_3 = 178.938$ | $d_3 = 1.70$ | $n_2 = 1.80610$ | $v_2 = 40.9$ |
| $r_4 = 18.000$ | $d_4 = 6.02$ | | |
| $r_5 = 245.958$ | $d_5 = 1.50$ | $n_3 = 1.63854$ | $v_3 = 55.4$ |
| $r_6 = 53.700$ | $d_6 = 0.10$ | | |
| $r_7 = 25.294$ | $d_7 = 3.18$ | $n_4 = 1.80518$ | $v_4 = 25.4$ |
| $r_8 = 60.500$ | $d_8 = 26.35 \sim 11.42 \sim 4.43$ | | |
| Rear Lens Group | | | |
| $r_9 = 56.177$ | $d_9 = 1.94$ | $n_5 = 1.77250$ | $v_5 = 49.7$ |
| $r_{10} = -123.980$ | $d_{10} = 0.10$ | | |
| $r_{11} = 17.541$ | $d_{11} = 2.00$ | $n_6 = 1.77250$ | $v_6 = 49.7$ |
| $r_{12} = 53.200$ | $d_{12} = 0.77$ | | |
| $r_{13} = 40.040$ | $d_{13} = 1.48$ | $n_7 = 1.51633$ | $v_7 = 64.1$ |
| $r_{14} = 31.900$ | $d_{14} = 1.87$ | | |

-continued

| | | | |
|---|---|---|---|
| $r_{15} = -85.725$ | $d_{15} = 2.69$ | $n_8 = 1.80518$ | $\nu_8 = 25.4$ |
| $r_{16} = 17.608$ | $d_{16} = 2.22$ | | |
| $r_{17} = 158.000$ | $d_{17} = 2.80$ | $n_9 = 1.56013$ | $\nu_9 = 47.0$ |
| $r_{18} = -23.537$ | $d_{18} = 0.10$ | | |
| $r_{19} = -94.050$ | $d_{19} = 2.00$ | $n_{10} = 1.51633$ | $\nu_{10} = 64.1$ |
| $r_{20} = -45.200$ | | | |

| F number | focal distance | back-focus |
|---|---|---|
| 1 : 3.5 | 28.8 | 38.035 |
| 1 : 4 | 40 | 45.582 |
| 1 : 4.5 | 48.9 | 51.579 |

$f_{1.2} = 135.798$  $\Delta f_B = 13.544$
$f_4 = -22.330$  $ls = 26.35$
$f_{6.7} = 50.050$  $R = 1.698$ where, $r_i$ is the radius of curvature of the $i^{th}$ lens surface in order from the object side;

$d_i$ is the distance between the $i^{th}$ and $(i + 1)^{th}$ lens surface;

$n_k$ is the refractive index of the $k^{th}$ lens in order from the object, and $\nu_k$ is the Abbe number of the $k^{th}$ lens in order from the object.

4. A zoom lens system including a front lens group having a negative focal distance with respect to the object side and a rear lens group having a positive focal distance with respect thereto, said front and rear lens groups being relatively axially displaceable to maintain the image plane at a constant position, characterized by:

(a) the front lens group comprising, in order from the object side, a first positive lens, a second negative meniscus lens having a high negative power with respect to the image side, a third negative lens, and a fourth positive lens having a high positive power with respect to the object side, (b) the first lens having a focal distance of $f_{1.2}$, the inverse refractive power of the image side of the second lens being $f_4$, and the focal distance between the image side of the third lens and the object side of the fourth lens being $f_{6.7}$, (c) the rear lens group comprising a double concave lens, at least two lenses disposed in front of the double concave lens including a double convex lens on the object side of the rear lens group, and at least two convex lenses disposed behind the double concave lens on the image side thereof, and (d) the lens system satisfying the following conditions:

(1) $0.25 < \dfrac{\Delta f_B}{ls \cdot R} < 0.38$, (2) $2.0 < \dfrac{f_{1.2}}{|Fa|} < 6.0$, (3) $0.35 < \dfrac{f_4}{Fa} < 0.6$, (4) $0.7 < \dfrac{f_{6.7}}{|Fa|} < 1.8$, (5) $0.35 < \dfrac{b}{a} < 0.55$, and (6) $0.040 < \dfrac{\Sigma}{2w \cdot Fs} < 0.056$ wherein:

$\Delta f_B$ is the back-focus zoom variation, ls is the air gap between the front and rear lens groups at the shortest focal distance, R is the magnification variation ratio, Fa is the focal distance of the front lens group, b is the distance between the object side of the double concave lens and the object side of the double convex lens, a is the total length of the rear lens group, $\Sigma$ is the overall length of the lens sytem, including the back-focus, 2w is the maximum angle of incidence, and Fs is the shortest focal distance, and wherein the minimum value of the back-focus is greater than Fs, said lens system furter defined by:

Angle of View 84° ~ 64°, Fa = −40.117

Front Lens Group

| | | | |
|---|---|---|---|
| $r_1 = 97.236$ | $d_1 = 3.30$ | $n_1 = 1.58913$ | $\nu_1 = 61.1$ |
| $r_2 = 1802.053$ | $d_2 = 0.10$ | | |
| $r_3 = 60.645$ | $d_3 = 1.20$ | $n_2 = 1.80400$ | $\nu_2 = 46.6$ |
| $r_4 = 16.748$ | $d_4 = 7.64$ | | |
| $r_5 = -3569.993$ | $d_5 = 1.20$ | $n_3 = 1.67790$ | $\nu_3 = 50.7$ |
| $r_6 = 48.437$ | $d_6 = 2.62$ | | |
| $r_7 = 27.575$ | $d_7 = 2.74$ | $n_4 = 1.80518$ | $\nu_4 = 25.4$ |
| $r_8 = 57.940$ | $d_8 = 19.014 \sim 12.834 \sim 4.973$ | | |

Rear Lens Group

| | | | |
|---|---|---|---|
| $r_9 = 66.935$ | $d_9 = 6.02$ | $n_5 = 1.80610$ | $\nu_5 = 40.9$ |
| $r_{10} = -92.610$ | $d_{10} = 0.27$ | | |
| $r_{11} = 18.790$ | $d_{11} = 2.99$ | $n_6 = 1.80610$ | $\nu_6 = 40.9$ |
| $r_{12} = 58.296$ | $d_{12} = 1.83$ | | |
| $r_{13} = -64.109$ | $d_{13} = 3.95$ | $n_7 = 1.84666$ | $\nu_7 = 23.9$ |
| $r_{14} = 20.000$ | $d_{14} = 2.87$ | | |
| $r_{15} = -89.868$ | $d_{15} = 2.25$ | $n_8 = 1.50977$ | $\nu_8 = 62.1$ |
| $r_{16} = -23.044$ | $d_{16} = 0.27$ | | |
| $r_{17} = 1284.874$ | $d_{17} = 2.20$ | $n_9 = 1.51633$ | $\nu_9 = 64.1$ |
| $r_{18} = -26.693$ | | | |

| F number | focal distance | back-focus |
|---|---|---|
| 1 : 3.5 | 24.507 | 36.624 |
| 1 : 4 | 28.000 | 39.259 |
| 1 : 4.5 | 34.200 | 43.937 |

$f_{1.2} = 174.339$  $\Delta f_B = 7.313$
$f_4 = -20.831$  $ls = 19.014$
$f_{6.7} = 61.445$  $R = 1.396$ where, $r_i$ is the radius of curvature of the $i^{th}$ lens surface in order from the object side;

$d_i$ is the distance between the $i^{th}$ and $(i + 1)^{th}$ lens surface;

$n_k$ is the refracture index of the $k^{th}$ lens in order from the object, and $\nu_k$ is the Abbe number of the $k^{th}$ lens in order from the object.

* * * * *